Aug. 20, 1935.   J. A. CAMERON   2,012,118
METHOD OF AND MEANS FOR WINDING A WEB OF FLEXIBLE MATERIAL
Filed Oct. 17, 1932   10 Sheets-Sheet 1

INVENTOR-
James A. Cameron
BY
ATTORNEY-

Aug. 20, 1935.    J. A. CAMERON    2,012,118
METHOD OF AND MEANS FOR WINDING A WEB OF FLEXIBLE MATERIAL
Filed Oct. 17, 1932    10 Sheets-Sheet 2

INVENTOR-
James A. Cameron
BY
ATTORNEY-

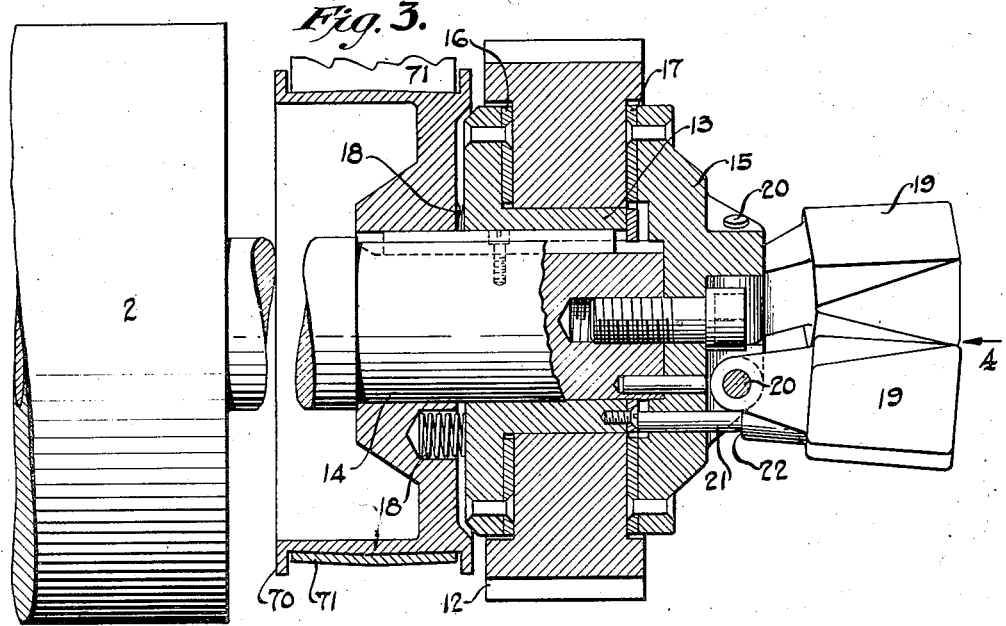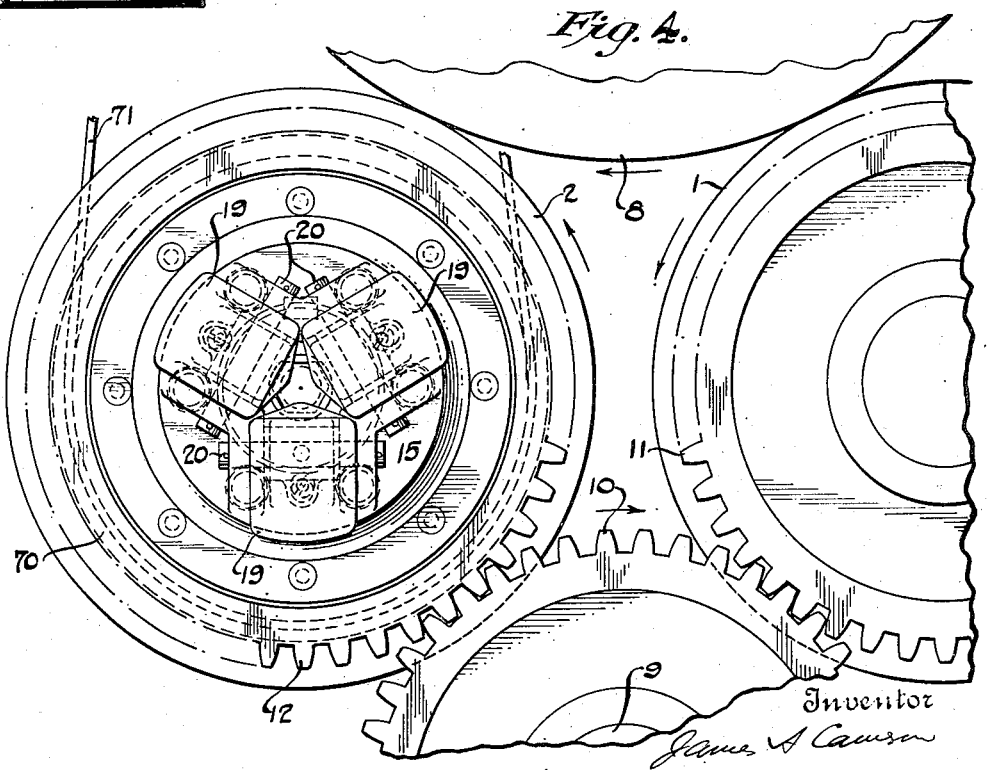

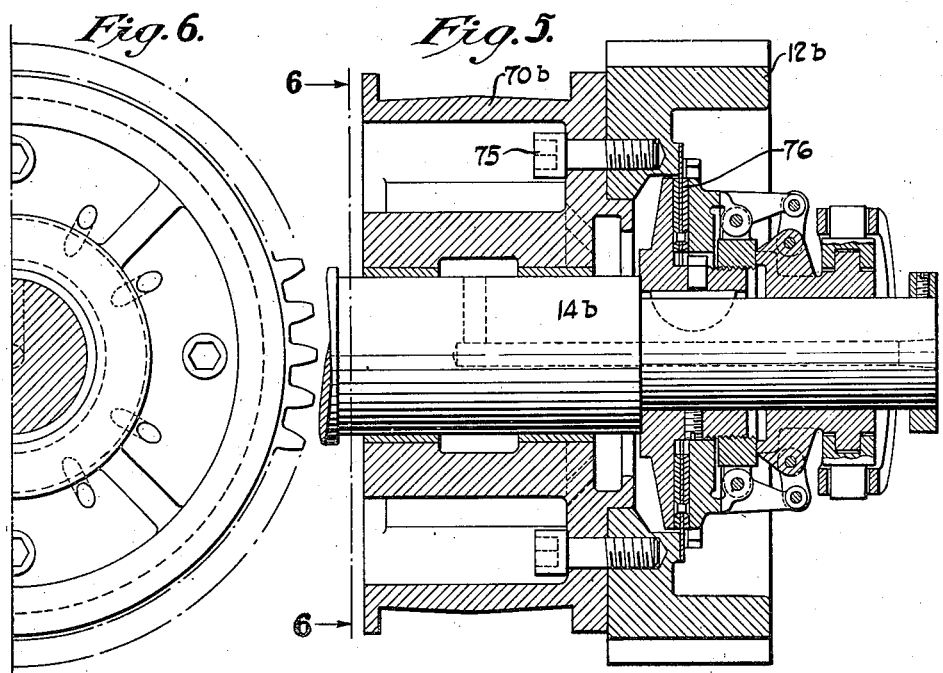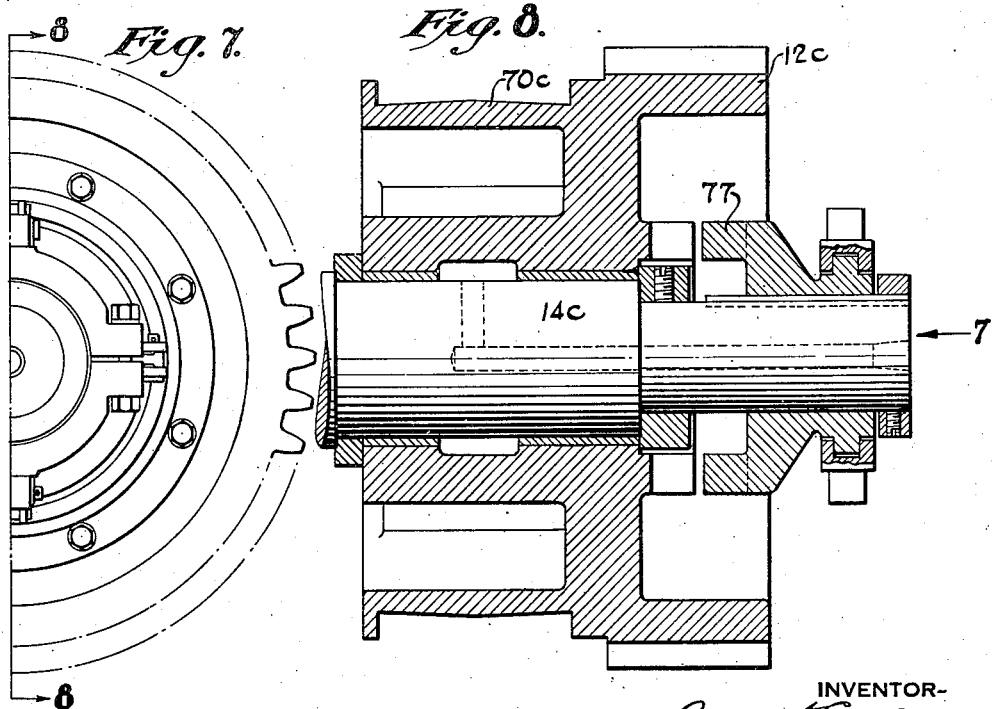

Aug. 20, 1935. J. A. CAMERON 2,012,118
METHOD OF AND MEANS FOR WINDING A WEB OF FLEXIBLE MATERIAL
Filed Oct. 17, 1932 10 Sheets-Sheet 5

INVENTOR-
James A. Cameron
BY
ATTORNEY-

Aug. 20, 1935.  J. A. CAMERON  2,012,118
METHOD OF AND MEANS FOR WINDING A WEB OF FLEXIBLE MATERIAL
Filed Oct. 17, 1932  10 Sheets-Sheet 6

INVENTOR-
James A. Cameron
BY
ATTORNEY-

Aug. 20, 1935.    J. A. CAMERON    2,012,118
METHOD OF AND MEANS FOR WINDING A WEB OF FLEXIBLE MATERIAL
Filed Oct. 17, 1932    10 Sheets-Sheet 8

INVENTOR
James A. Cameron
BY
ATTORNEY

Aug. 20, 1935.    J. A. CAMERON    2,012,118
METHOD OF AND MEANS FOR WINDING A WEB OF FLEXIBLE MATERIAL
Filed Oct. 17, 1932    10 Sheets-Sheet 9

INVENTOR
James A Cameron
BY
ATTORNEY

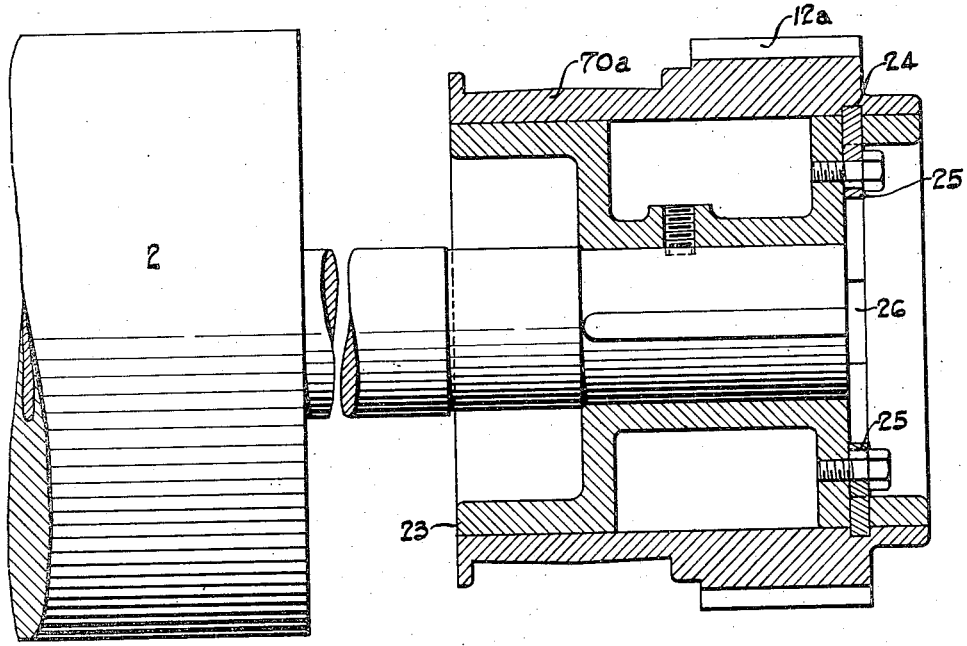
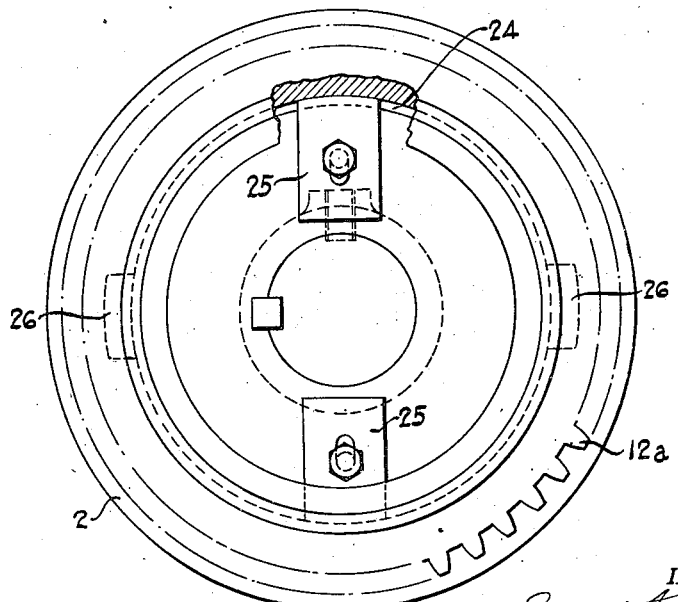

Patented Aug. 20, 1935

2,012,118

UNITED STATES PATENT OFFICE 2,012,118

METHOD OF AND MEANS FOR WINDING A WEB OF FLEXIBLE MATERIAL

James A. Cameron, Brooklyn, N. Y., assignor to Cameron Machine Company, Brooklyn, N. Y., a corporation of New York Application October 17, 1932, Serial No. 638,102

17 Claims. (Cl. 242—66)

This invention relates to a method of and means for winding a web of flexible material, and has for its main object and feature the production of sufficiently "dense" rolls in which the web is nevertheless devoid of undue tension.

In the accompanying drawings the invention is disclosed in several concrete and preferred forms in which:

Fig. 3 is an enlarged vertical sectional view substantially on the plane of line 3—3 of Fig. 1;

Fig. 4 is an enlarged view of the winding drums and adjacent elements shown in Fig. 1, and looking in the direction of arrow 4 of Fig. 3;

Fig. 5 is a vertical sectional view of a modified form of drive for the rear winding drum;

Fig. 6 is a fragmentary sectional view, substantially on the plane of line 6—6 of Fig. 5;

Fig. 7 is a fragmentary view looking in the direction of arrow 7 of Fig. 8, showing a second modified form of drive;

Fig. 8 is a sectional view substantially on the plane of line 8—8 of Fig. 7;

Fig. 19 is a view similar to Fig. 3 but showing a seventh modified form of drive; and Fig. 20 is an end elevation, partly in section, looking from the right of Fig. 19.

Figure 1:
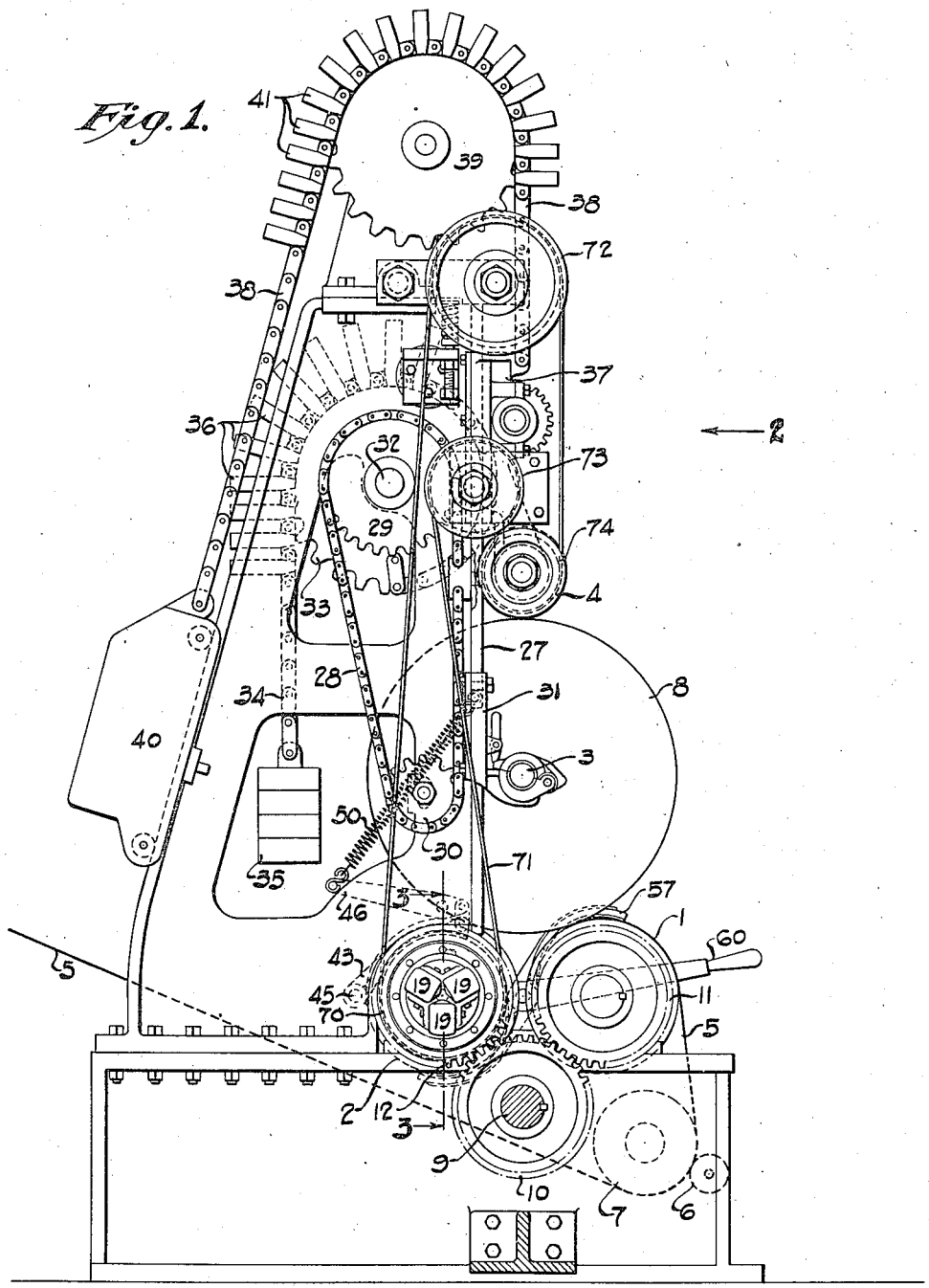
Fig. 1 is a view mostly in side elevation but partly in section of a winding machine embodying the invention.

The type of winding machine to which the invention relates is generally denominated a two-drum surface winder, the front winding drum of which is indicated at 1 (Fig. 1) and the rear winding drum at 2. 3 denotes a winding shaft located in the valley between the drums, and 4 is a riding roller or top-pressure roller which may or may not be used. The web to be wound is shown at 5 and is led over suitable guides to the front winding drum and thence to the rear winding drum and to the winding shaft. If it be desired to slit the web, suitable slitting means of any type may be employed such as shear-cutters or score-cutters, and if score-cutters as 6 are used they may act against a backing roll 7 over which the web passes or they may act against the front winding drum in a manner well understood. The roll of wound material is indicated at 8 and, as this roll increases in diameter, the winding shaft and riding roller are displaced upwardly in a manner well known in the art.

It is desirable that the roll of wound material be "dense", by which is meant that it must be tightly wound, but it will be understood that there is a degree of tightness at which the roll is not only "dense" but the convolutions thereof are so "tense" as to make the web liable to tearing and cracking. Such tension is undesirable and the problem is therefore to render the roll "dense" without making the web on the roll "tense".

In the prior art it has been attempted to control the "density" and "tension" of the roll by providing clutches both on the front and rear winding drums to be manipulated at the will of the operator. The present invention proceeds on an entirely different basis in that the front winding drum is driven by transmission means at all times, and the rear winding drum is normally driven by frictional contact with, and is therefore controlled by, the wound material. In this way, the speed of the rear winding drum, during the normal operation of the machine, can never exceed that of the front winding drum and consequently the web will be laid on the roll devoid of excessive tension. In order, however, to insure the production of a tightly wound core, the rear winding drum is given a boost at the beginning of the winding operation or, to put it differently, assistance is given the rear winding drum. This assistance may be of such character that, for a brief period during the formation of the core, the speed of the rear winding drum exceeds that of the front winding drum although, preferably, the speed of the rear winding drum even during the formation of the core does not exceed that of the front winding drum. The assistance given the rear winding drum may also be of a continuing character, but in such cases it will preferably have a diminishing propelling force as the winding proceeds, that is to say the control exercised by the roll of wound material will be a more powerful factor than the factor of assistance. In any event, the speed of the rear winding drum, during the normal operation of the machine, must not exceed that of the front winding drum.

In accordance with the foregoing, and referring now to Figs. 1 to 4 inclusive, 9 indicates a power shaft carrying gear 10 that meshes with gear 11 on front winding drum to drive said drum at all times. 12 indicates a gear also meshing with gear 10, and between said gear 12 and the rear winding drum is interposed a speed-controlled slip-friction drive which here takes the following form: 13 indicates a sleeve keyed to rear winding drum shaft 14, and carried by the latter is also a bracket 15. Gear 12 is mounted to rotate freely on sleeve 13, and 16 and 17 indicate friction surfaces, adjacent gear 12 and carried by sleeve 13 and bracket 15. Springs 18 tend to urge sleeve 13 outwardly of the length of the shaft and therefore to render friction surfaces 16 and 17 effective to drive the rear winding drum shaft from gear 12. Carried by bracket 15 is a centrifugal governor consisting of weights 19 pivotally supported at 20 and held in an ineffective or collapsed position by means of slidable pins 21 each engaging a surface 22 of a weight 19 at one side of pivotal center 20, said pins being urged outwardly by springs 18 acting through sleeve 13. It will now be seen that when shaft 9 is running at low speed, at the beginning of the winding operation, motion will be transmitted not only to the front winding drum but also to the rear winding drum and that, when a certain speed of the rear winding drum has been attained, weights 19 will swing on their pivots and will by means of surfaces 22 and pins 21 overcome the action of springs 18 and will tend to separate friction surfaces 16 and 17 from gear 12 so that the rear winding drum is no longer driven from gear 12, and consequently the rear winding drum will then be driven by frictional contact with the roll of wound material. In the form of the invention so far described, it is contemplated that the rear winding drum shall receive a boost or assistance from gear 12 only during the first few revolutions of the machine, at which time the parts are rotating slowly, and that, as soon as the machine attains full speed, gear 12 ceases to be effective. Attention is also called to the fact that the clutch between gear 12 and the rear winding drum is a slip-friction device, and not a toothed clutch, which can be so arranged that if there is excessive reluctance to turn on the part of the rear winding drum due to tension of the web, said clutch may slip and allow the rear winding drum to turn more slowly, and this would be particularly true when the speed governor has somewhat relaxed pressure of friction surfaces 16 and 17 and before they are entirely disengaged.

To emphasize still further the point that the assistance to be given the rear winding drum may only be required momentarily so to speak, attention is called to Figs. 19 and 20 in which gear 12a, that corresponds to gear 12 of Figs. 3 and 4, is loosely mounted on a large diameter hub 23 fast on the shaft of the rear winding drum. The static friction between the outer face of the hub and the bore of the gear will, when gear 12a is rotated, provide sufficient power to start the drum. Nevertheless, if the roll of wound material causes the drum to turn at a different speed, said drum will be able to run at its own speed due to the fact that the friction between the hub and the gear, owing to the difference between static and running friction, will be less when the machine is running than when it is starting up. Thus the device constitutes in effect a slip-friction clutch. In order to keep the gear from moving endwise of the hub, it is provided with a circumferential groove 24 into which extend two plates 25 that are bolted to the hub. If for any reason it is desired to lock the gear and hub together so that they will rotate in unison, said plates 25 can be inserted into openings 26 that communicate with groove 24.

The devices so far described are not, however, the only means whereby the rear drum can be given assistance. In the absence of, or in addition to, the clutch means of Figs. 3 and 4, and the "persuader" of Figs. 19 and 20 means can be provided to control the transmission of power from the front winding drum, through the wound material to the rear winding drum. As here shown (Figs. 1 and 2) such means may take the form of initially overweighting the winding shaft or the top-pressure roller, if used, or both. Winding shaft carriage 31 slides on uprights 27 of the framework and is connected to an endless chain 28 passing over sprockets 29 and 30. Sprocket 29 is fixed on a shaft 32 that also carries sprocket 33, and trained over the latter is a chain 34 carrying, in addition to counterweight 35, a plurality of weights 36. It will be seen that, at the beginning of the winding operation, winding shaft 3 is down in the crotch between the two drums and therefore weights 36 will be largely, if not altogether, to the right (as viewed in Fig. 1) of the center of rotation 32 and hence will bring to bear considerable downward pressure on the winding shaft, whereby the impelling force of the front winding drum will be more readily transmitted through the material being wound to the rear winding drum. As the diameter of the wound material increases more and more of the weights 36 will be displaced to the left (as viewed in Fig. 1) of center 32. Hence the weight on the winding shaft will be relieved, so that counterweighting to any extent can be obtained not merely to compensate for the increase in weight of the wound material, but in excess of such compensation. Thus the rear winding drum will be able to assert itself and need not follow the speed of rotation of the front winding drum. In like manner, top-pressure roller carriage 37, which also slides on the framework, is connected to a chain 38 that passes over sprocket 39, and carries, in addition to weight 40, a plurality of weights 41. This acts, as will be understood, initially to overweight the top-pressure roller which rests on the wound material of the winding shaft, and thereafter, as the diameter of the wound material grows, to counter-balance it and, if desired, to lessen the transmission of power to the rear winding drum.

Figure 2:
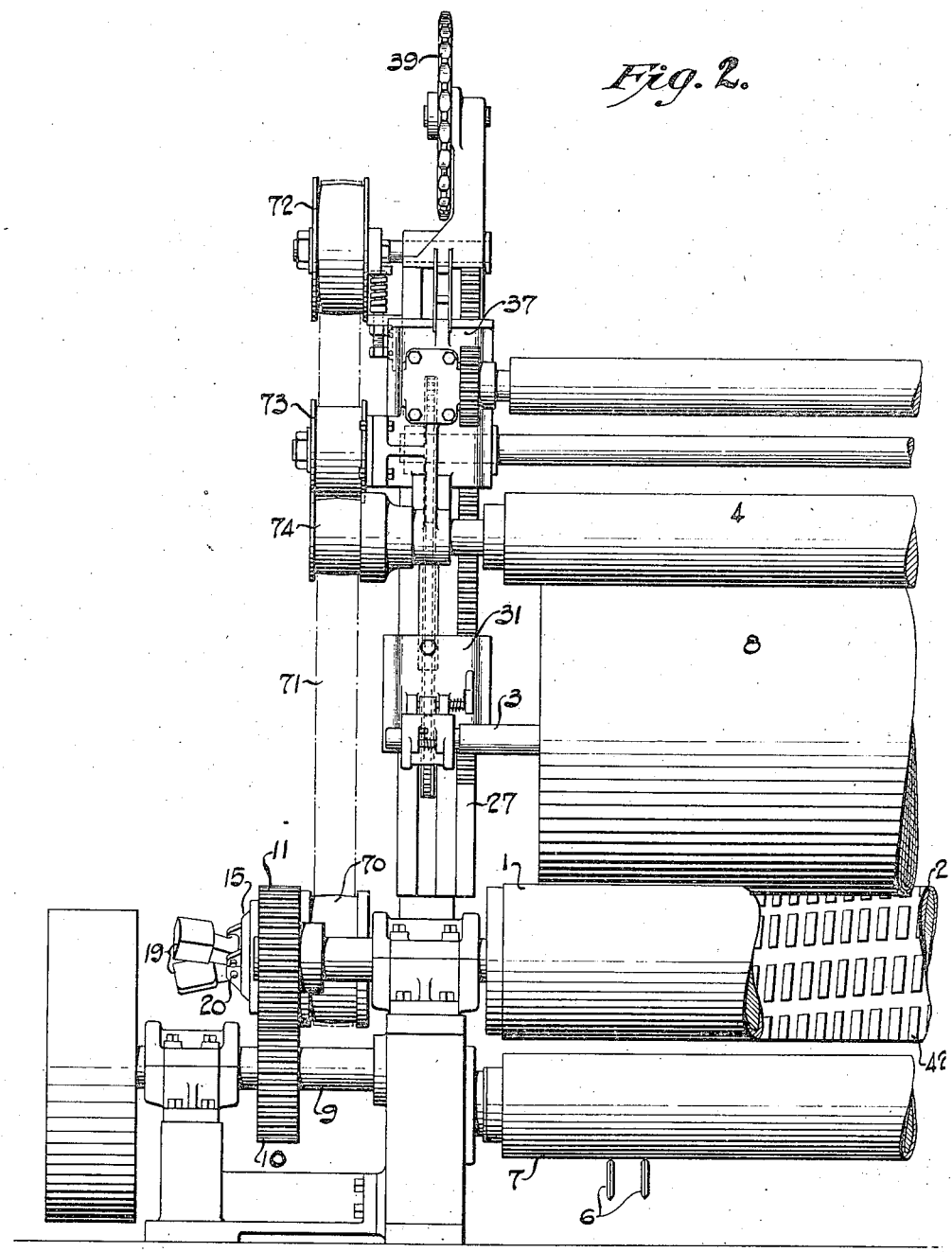
Fig. 2 is a fragmentary view in elevation of the machine looking in the direction of arrow 2 of Fig. 1.
Figure 15:
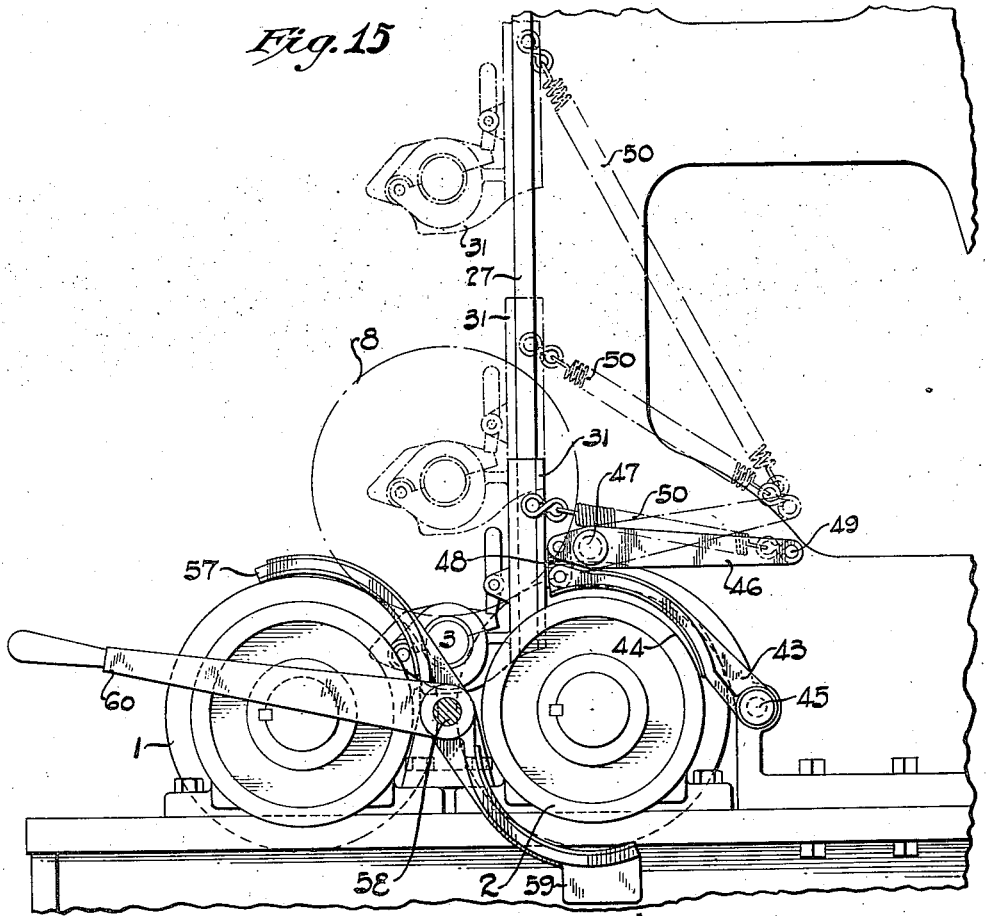
Fig. 15 is a view in end elevation and partly in section showing a brake mechanism.

Aside from, or in addition to, the foregoing several means, the assistance to the rear winding drum may be given by providing the surface of the rear winding drum with a frictional surface of a character different from that of the front winding drum. Thus the surface of the rear winding drum may be roughened or, as shown in Fig. 2, can be provided with groove 42 of a character similar to that of the grooves disclosed in Patents Nos. 1,355,106 and 1,355,107 to thereby increase the frictional contact between the wound material and the rear winding drum. At the beginning of the winding operation, this additional frictional contact will enable the wound material to take hold more readily of the rear winding drum and will thereafter enable it to control the speed of rotation of said drum. As a further alternative means, another expedient may be resorted to. This consists, as shown in Figs. 1 and 4, in placing the rear winding drum at a slightly lower level than the front winding drum. This causes the rear winding drum, as the wound material increases, to sustain more and more of the weight of said wound material, and thus not only prevents a tendency on the part of the wound material to jump over the crest of the front winding drum but also, especially when associated with the initially overweighted winding shaft or riding roller to control the rear winding drum. In some cases it is found desirable, in order to prevent the production of undue tension in the web of the roll, to positively retard the rotation of the rear drum independently of the front drum. As indicated in Figs. 1 and 15, this may be done automatically by an increase in the diameter of the wound material. As shown in said drawings, 43 indicates a brake-shoe to engage a surface 44 on the rear winding drum, said shoe being pivotally supported at 45 on the framework. 46 is a lever pivotally supported at 47 on the framework and connected by means of a link 48 to the brake-shoe. The free end 49 of lever 46 is biased as by means of its own weight to lift the brake-shoe out of contact with surface 44. 50 indicates a spring connected to free end 49 and to winding shaft carriage 31. At the beginning of the winding operation, the parts are in the position shown in full lines in Fig. 15 and spring 50 is ineffective. As the winding shaft carriage rises, however, said spring 50 becomes more and more effective to turn lever 46 on its pivot 47 and thus the brake-shoe is applied to surface 44 to exert a retarding influence on the rear winding drum independently of the front winding drum. The dotted line indications in Fig. 15 show the progressive action of the brake.

Figure 16:
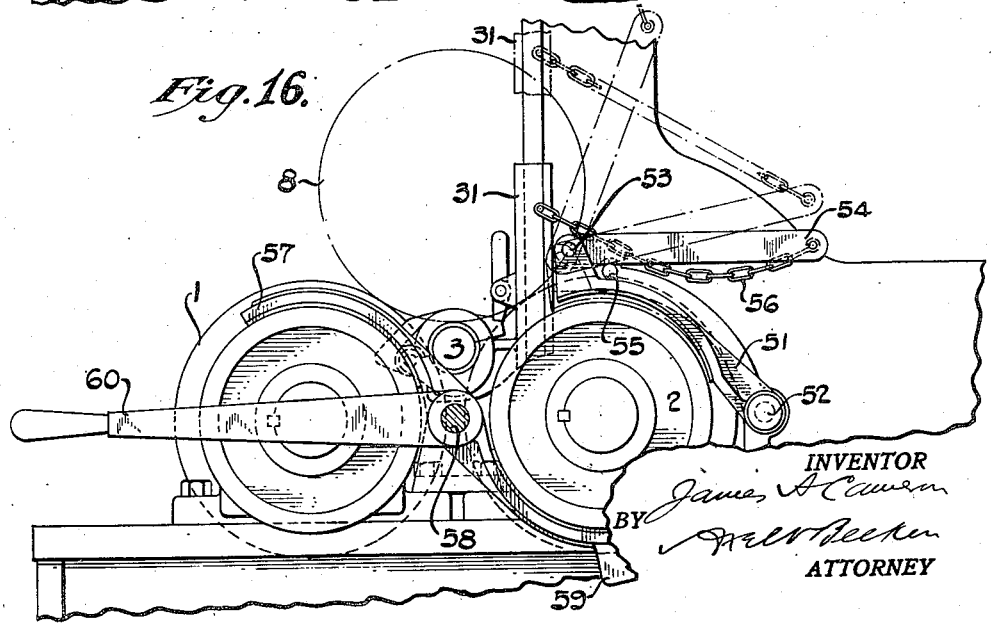
Fig. 16 is a view similar to Fig. 15 showing a modified form of brake mechanism.

In Fig. 16 is shown a modified form of the brake construction. Here the brake-shoe 51 is pivotally supported at 52 and has its free end pivotally connected at 53 to lever 54. The free end of said lever 54 is weighted thereby causing said lever to rest on stop 55 and to hold the brake-shoe out of contact with the drum. 56 is a flexible connection extending between lever 54 and the winding shaft carriage, so that, as said carriage rises as indicated in dotted lines in Fig. 16, lever 54 will apply the brake.

In addition to the foregoing, braking means may be employed for both drums. In Figs. 1, 15 and 16, said means take the form of an S-brake 57 pivotally supported at 58 and held out of contact with the drums by means of weight 59. 60 indicates a handle by means of which the S-brake can be applied to the drums.

Figure 17:
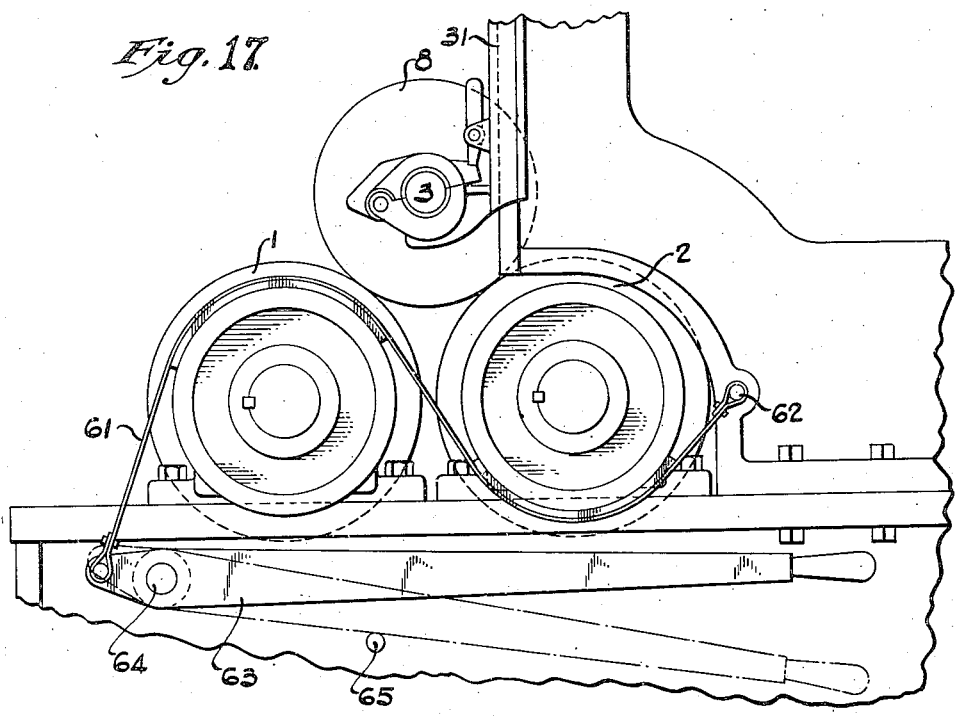
Fig. 17 is a view similar to Figs. 15 and 16, showing a second modified form of brake mechanism.

Other forms of brakes may of course be employed. In Fig. 17 a brake band 61 anchored at 62 is utilized. The free end of the brake band is connected to lever 63 pivoted at 64, and the weight of said lever normally brings it against stop 65 thereby relaxing tension on the brake band. When said lever is lifted, as shown in full lines in Fig. 17, the brake band is tightened.

Figure 18:
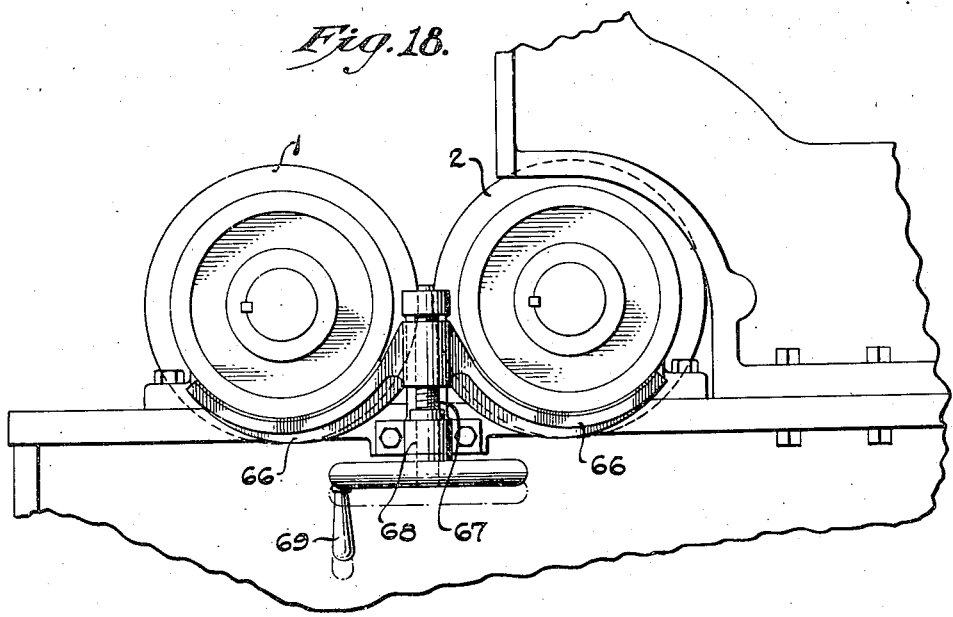
Fig. 18 is a view similar to Fig. 17 showing a third modified form of brake mechanism.

In Fig. 18, two brake-shoes 66 are carried by a spindle 67 that can be raised or lowered in bushing 68 by means of handwheel 69.

If a top-pressure roller as 4 is employed, it may run idle or it may be driven, and the driving of said top-pressure roller can be controlled by the rear drum or independently thereof. Adverting again to Figs. 1 to 4 inclusive, it will be seen that 70 indicates a pulley keyed to rear winding drum shaft 14, and that from this pulley extends a belt 71 which is trained around pulley 72 on the framework of the machine and around pulleys 73 and 74 of riding roll carriage 37. Pulley 74 is on the shaft of top-pressure roller 4. In this construction therefore the top-pressure roll has a speed of rotation like that of the rear winding drum and is, like the latter, controlled by the wound material.

In Figs. 19 and 20, pulley 70a, which corresponds to pulley 70 of Figs. 1 to 4, moves at all times with gear 12a and is here integral therewith. In this form of the invention therefore, the top-pressure roller is driven at all times and moves at a speed independently of that of the rear winding drum.

In Figs. 5 and 6, gear 12b is loose on the rear winding drum shaft and has a pulley 70b for top-pressure roll transmission bolted to it at 75. Interposed between winding drum shaft 14b and gear 12b is a manually operated slip-friction clutch 76. In this case therefore, the top-pressure roll is driven at all times, but the rear winding drum is driven by gear 12b only when clutch 76 is thrown in.

In Figs. 7 and 8, gear 12c is loose on rear winding drum shaft 14c and has a pulley 70c for the transmission of power to the top pressure roll which latter is therefore driven at all times. 77 indicates a manually operated toothed clutch between gear 12c and rear winding drum shaft 14c. This form of the invention therefore operates exactly like the construction in Figs. 5 and 6, except that the drive for the winding drum shaft is not a slip-friction device.

Figure 9:
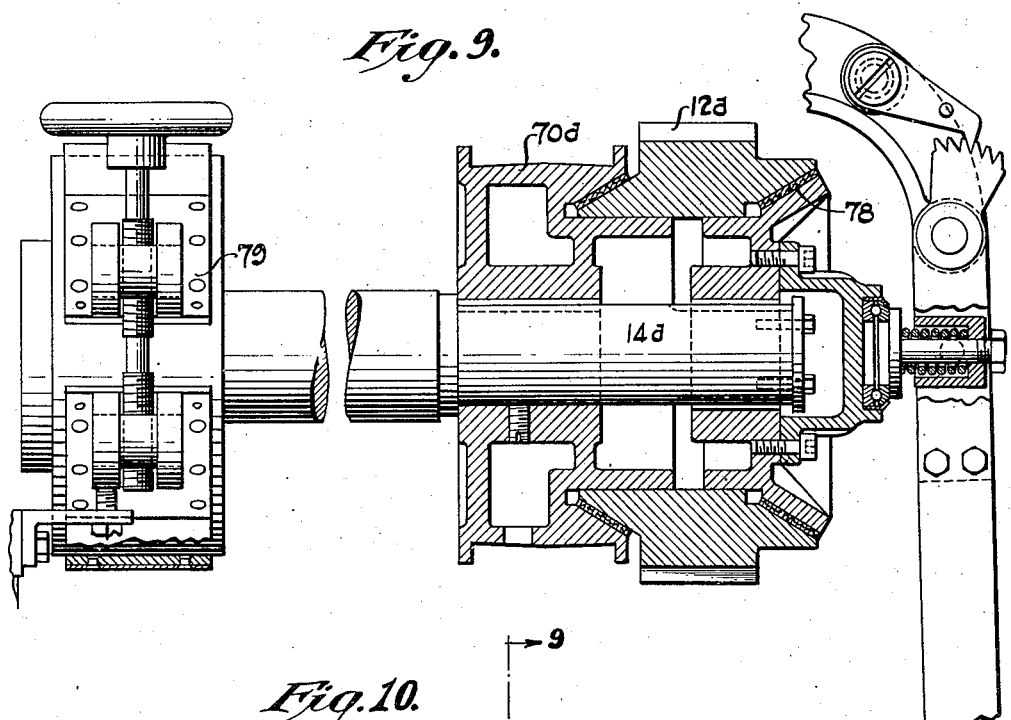
Fig. 9 is a sectional view substantially on the plane of line 9—9 of Fig. 10, showing a third modified form of drive.
Figure 10:
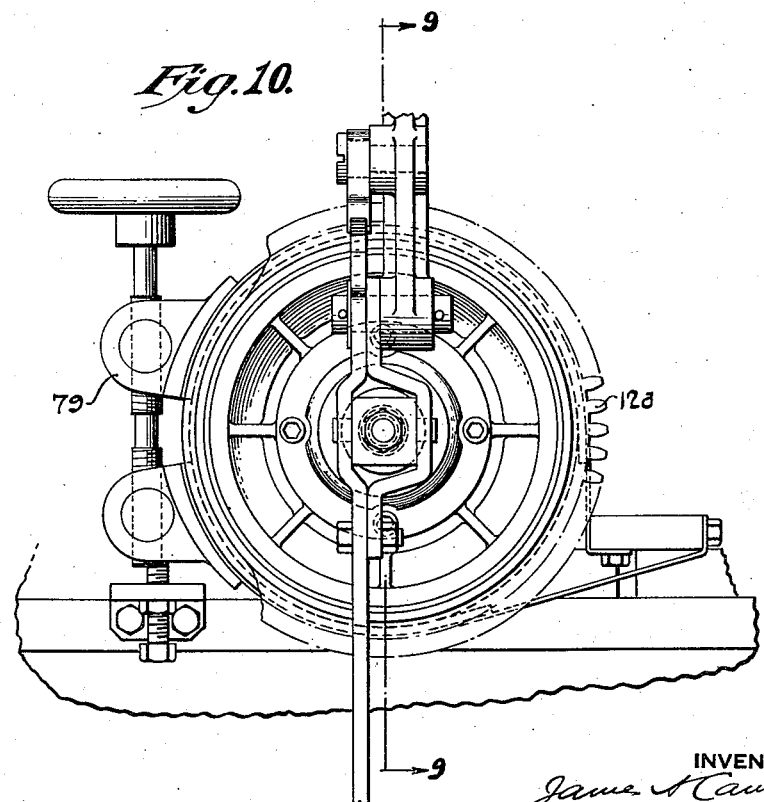
Fig. 10 is an end view looking from the right in Fig. 9.

In Figs. 9 and 10, pulley 70d for the top-pressure roller is fast on rear winding drum shaft 14d so that the top-pressure roll is driven at the same speed as that of the rear winding drum. Gear 12d is loose on shaft 14d but has a manually operated slip-friction clutch 78 so the rear winding drum may be driven at will from gear 12d. These figures also show a manually operated brake 79 for the rear winding drum.

Figure 11:
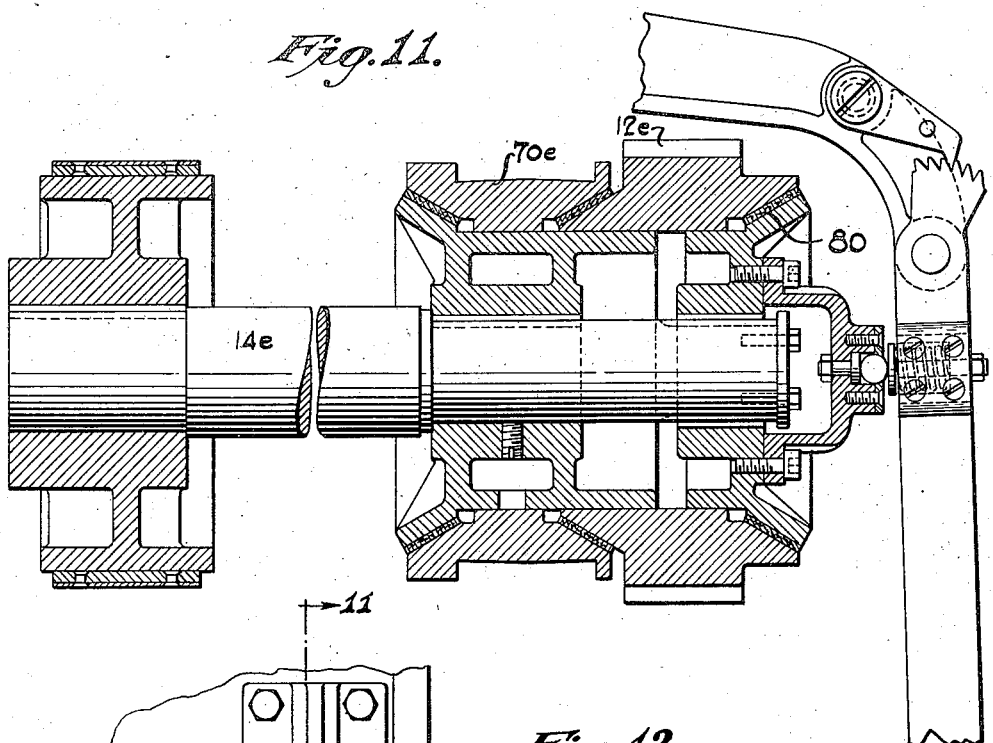
Fig. 11 is a sectional view substantially on the plane of line 11—11 of Fig. 12 showing a fourth modified form of drive.
Figure 12:
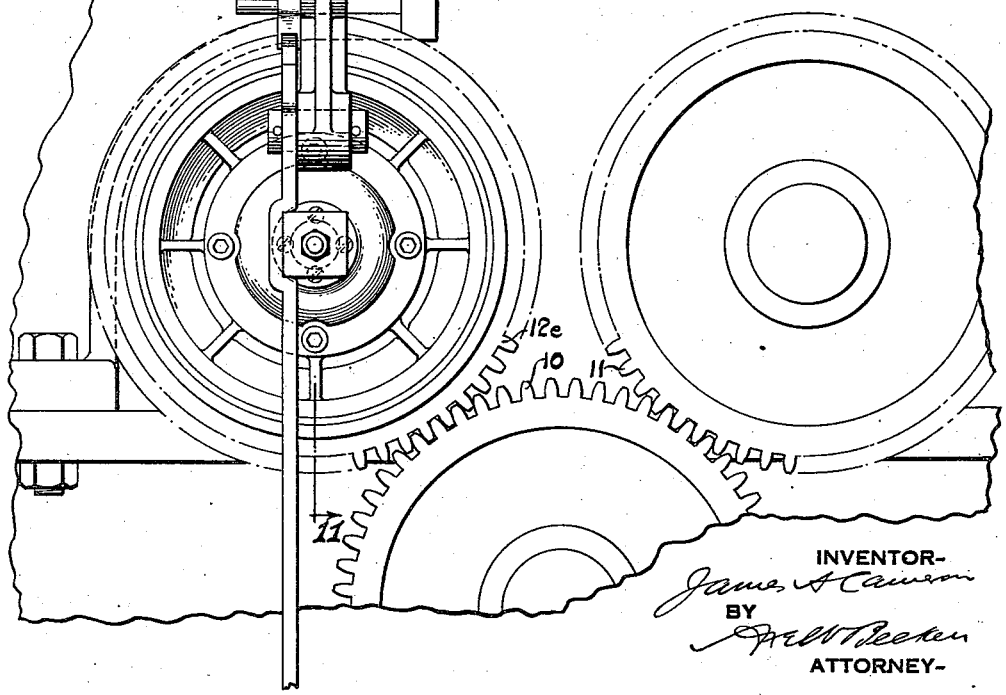
Fig. 12 is an end view looking from the right of Fig. 11.

In Figs. 11 and 12, pulley 70e is independent both of rear winding drum shaft 14e and gear 12e, and the latter is connected both to the pulley and to the shaft by a manual clutch 80 controlling contact between the slip-friction surfaces indicated. In this form of the invention, therefore, the rear winding drum and the top-pressure roll are both driven from gear 12e when clutch 80 is in but, when the clutch is out, the rear winding drum and the top-pressure roller rotate at such speed as the wound material may impart to them.

Figure 13:
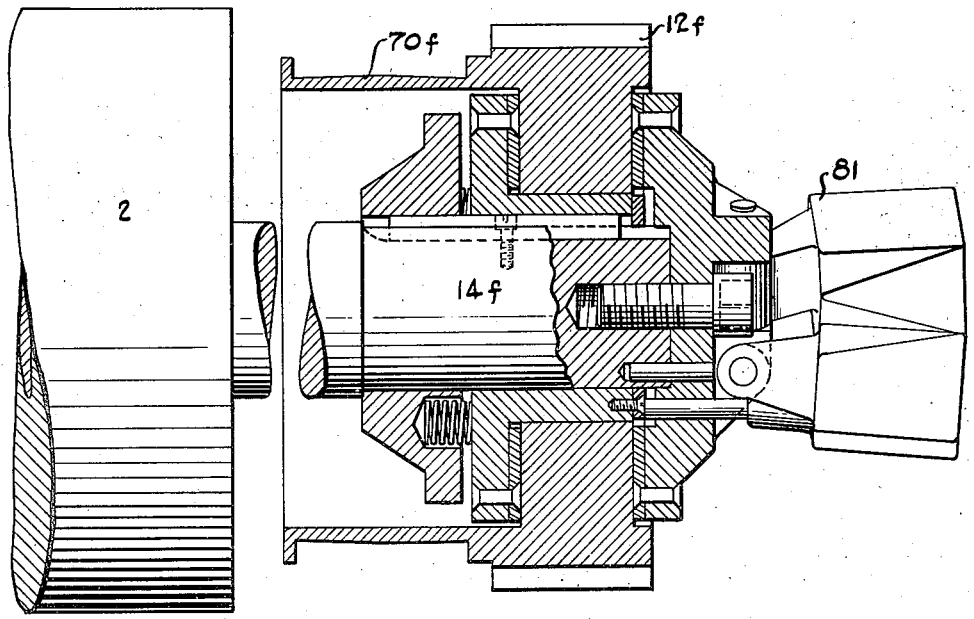
Fig. 13 is a sectional view, similar to the preceding sectional views, showing a fifth modified form of drive.

In Fig. 13, pulley 70f and gear 12f are integral and are both loose on rear winding drum shaft 14f. A speed-controlled slip-friction clutch 81, serves to disengage gear 12f from shaft 14f when a given speed has been attained. Therefore the top-pressure roller is driven at all times from gear 12f, but the drum is only driven from said gear 12f at low speeds.

Figure 14:
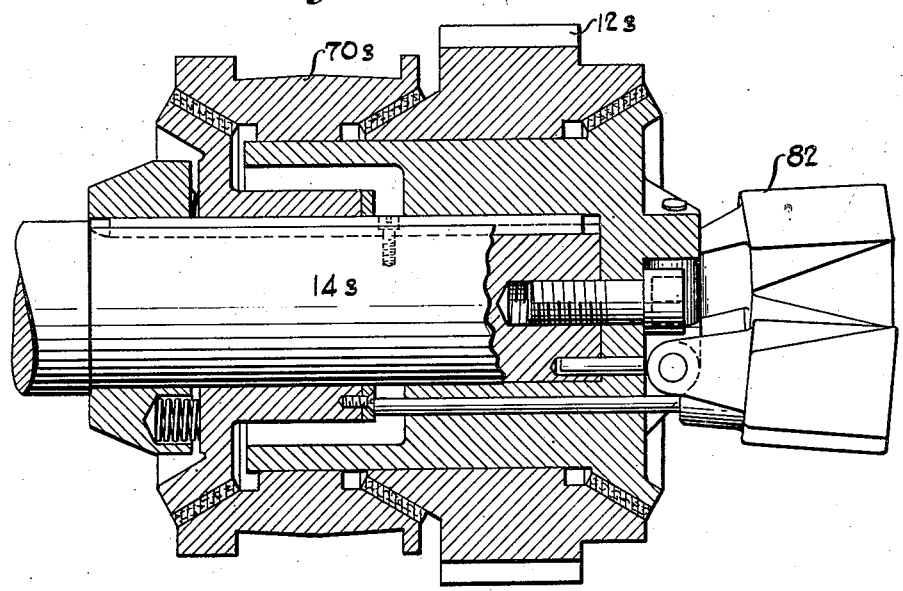
Fig. 14 is a sectional view, similar to Fig. 13, showing a sixth modified form of drive.

In Fig. 14, pulley 70g and gear 12g are both loose on rear winding drum shaft 14g, and a speed-controlled slip-friction clutch 82 connects the gear at low speeds to the rear winding drum shaft and to the pulley and disconnects it at high speed.

I claim:

1. In a winding machine, a driven front winding drum, a rotatable rear winding drum normally driven by frictional contact with the material being wound in the valley between the drums, transmission means to at all times drive the front winding drum, means other than the wound material to drive the rear winding drum, and speed-governed mechanism, controlled by the rotation of the rear winding drum, to render said drive means ineffective.

2. In a winding machine, a driven front winding drum, a rotatable rear winding drum normally driven by frictional contact with the material being wound in the valley between the drums, transmission means to at all times drive the front winding drum, and means, controlled by the increase in diameter of the wound material to retard the rotation of the rear winding drum independently of that of the front winding drum.

3. In a winding machine, a driven front winding drum, a rotatable rear winding drum normally driven by frictional contact with the material being wound in the valley between the drums, transmission means to at all times drive the front winding drum, retarding means for both drums, and means to retard the speed of the rear winding drum independently of that of the front winding drum.

4. In a winding machine, a driven front winding drum, a rotatable rear winding drum normally driven by frictional contact with the material being wound in the valley between the drums, transmission means to at all times drive the front winding drum, a top-pressure roll normally driven by frictional contact with the wound material, and means to at times drive the rear winding drum and top-pressure roll.

5. In a winding machine, a driven front winding drum, a rotatable rear winding drum normally driven by frictional contact with the material being wound in the valley between the drums, transmission means to at all times drive the front winding drum, a top-pressure roll driven from the rear winding drum, and means to at times drive the rear winding drum.

6. In a winding machine, a driven front winding drum, a rotatable rear winding drum normally driven by frictional contact with the material being wound in the valley between the drums, transmission means to at all times drive the front winding drum, a top-pressure roll, transmission means to drive said roll at all times, and means to at times drive the rear winding drum.

7. In a winding machine, a driven front winding drum, a rotatable rear winding drum normally driven by frictional contact with the material being wound in the valley between the drums, transmission means to at all times drive the front winding drum, a top-pressure roll, transmission means to drive said roll at all times, and speed-controlled means to at times drive the rear winding drum.

8. In a winding machine, a driven front winding drum, a rotatable rear winding drum normally driven by frictional contact with the material being wound in the valley between the drums, transmission means to at all times drive the front winding drum, a top-pressure roll normally driven by frictional contact with the wound material, and speed-controlled means to at times drive the rear winding drum and the top pressure roll.

9. The method of winding flexible web material in a two-drum surface winder which consists in establishing a relatively greater frictional contact between the wound material and the rear winding drum than exists between the wound material and the front winding drum, and in varying, within the speed limit of the front winding drum, the speed of the rear winding drum without affecting the speed of the front winding drum.

10. In a winding machine, a surface winding drum, transmision means to drive the drum, a speed-controlled clutch to disengage the transmission means from the drum when a given drum speed has been attained, and a winding shaft frictionally engaging with the winding drum.

11. In a winding machine, a driven front winding drum, a rotatable rear winding drum normally driven by frictional contact with the material being wound on a winding shaft in the valley between the drums, a winding shaft supported by the drums, means to lead a web of flexible material to the front winding drum and thereafter to the rear winding drum and winding shaft, transmission means to at all times drive the front winding drum, and means, including a friction member that slips in response to the driving influence of the wound material, interconnected with said transmission means to drive the rear winding drum at the beginning of the winding operation.

12. In a winding machine, a driven front winding drum, a rotatable rear winding drum normally driven by frictional contact with the material being wound on a winding shaft in the valley between the drums, a winding shaft supported by the drums, means to lead a web of flexible material to the front winding drum and thereafter to the rear winding drum and winding shaft, transmission means to at all times drive the front winding drum, and means to obtain a relatively greater frictional contact between the wound material and the rear winding drum than exists between the wound material and the front winding drum.

13. In a winding machine, a driven front winding drum, a rotatable rear winding drum normally driven by frictional contact with the material being wound on a winding shaft in the valley between the drums, a winding shaft supported by the drums, means to lead a web of flexible material to the front winding drum and thereafter to the rear winding drum and winding shaft, transmission means to at all times drive the front winding drum, and means to retard the rotation of the rear winding drum independently of the rotation of the front winding drum.

14. In a winding machine, a driven front winding drum, a rotatable rear winding drum normally driven by frictional contact with the material being wound on a winding shaft in the valley between the drums, a winding shaft supported by the drums, means to lead a web of flexible material to the front winding drum and thereafter to the rear winding drum and winding shaft, transmission means to at all times drive the front winding drum, means, interconnected with said transmission means, to drive the rear winding drum at the beginning of the winding operation, and means to retard the rotation of the rear winding drum independently of the rotation of the front winding drum.

15. In a winding machine, a driven front winding drum, a rotatable rear winding drum normally driven by frictional contact with the material being wound on a winding shaft in the valley between the drums, a winding shaft supported by the drums, means to lead a web of flexible material to the front winding drum and thereafter to the rear winding drum and winding shaft, transmission means to at all times drive the front winding drum, means to obtain a relatively greater frictional contact between the wound material and the rear winding drum than exists between the wound material and the front winding drum, and other means to control the transmission of power from the front winding drum through the wound material to the rear winding drum.

16. In a winding machine, a driven front winding drum, a rotatable rear winding drum normally driven by frictional contact with the material being wound on a winding shaft in the valley between the drums, a winding shaft supported by the drums, means to lead a web of flexible material to the front winding drum and thereafter to the rear winding drum and winding shaft, transmission means to at all times drive the front winding drum, and means governed by the rear winding drum to control the propulsive effect of said rear winding drum.

17. The method of winding flexible web material on a winding shaft in a two-drum surface winder which consists in leading the flexible material to the front winding drum and thereafter to the rear winding drum and winding shaft, in driving the front winding drum at all times, and in controlling rotation of the rear winding drum by the material being wound on the shaft in the valley between the two drums without affecting the speed of the front winding drum.

JAMES A. CAMERON.

CERTIFICATE OF CORRECTION.

Patent No. 2,012,118.                                                       August 20, 1935.

JAMES A. CAMERON.

It is hereby certified that error appears in the printed specification of the above numbered patent requiring correction as follows: Page 4, first column, line 11, claim 1, strike out the word and comma "drums,"; and second column, line 74, claim 14, after "operation" strike out the period and insert a comma; and that the said Letters Patent should be read with these corrections therein that the same may conform to the record of the case in the Patent Office.

Signed and sealed this 8th day of October, A. D. 1935.

Leslie Frazer

Acting Commissioner of Patents.

(Seal)